(12) United States Patent
Genswein et al.

(10) Patent No.: US 7,021,553 B2
(45) Date of Patent: Apr. 4, 2006

(54) SPACE HEATING SYSTEM WITH FUEL CELLS AND A CONNECTION TO A PUBLIC ELECTRICAL NETWORK

(75) Inventors: Stefan Genswein, Erzingen (DE); René Dittli, Duernten (CH)

(73) Assignee: Sulzer Hexis AG, Winterthur (CH)

( * ) Notice: Subject to any disclaimer, the term of this patent is extended or adjusted under 35 U.S.C. 154(b) by 109 days.

(21) Appl. No.: 10/653,736

(22) Filed: Sep. 2, 2003

(65) Prior Publication Data

US 2004/0043268 A1 Mar. 4, 2004

(30) Foreign Application Priority Data

Sep. 4, 2002 (EP) .................................. 02405764

(51) Int. Cl.
*G05D 23/00* (2006.01)
(52) U.S. Cl. ........................... 237/2 A; 237/12; 429/12
(58) Field of Classification Search ............... 237/12.1, 237/2 A; 60/39; 429/12, 13, 14, 17
See application file for complete search history.

(56) References Cited

U.S. PATENT DOCUMENTS

| | | | | |
|---|---|---|---|---|
| 4,240,581 A | * | 12/1980 | Fowler | ....................... 237/12.1 |
| 4,510,756 A | * | 4/1985 | Hise et al. | ..................... 60/659 |
| 4,754,607 A | * | 7/1988 | Mackay | ........................ 60/723 |
| 5,045,414 A | * | 9/1991 | Bushnell et al. | ............... 429/17 |

(Continued)

FOREIGN PATENT DOCUMENTS

EP  1205993 A1  5/2002

(Continued)

OTHER PUBLICATIONS

O'Sullivan, "Fuel Cell Inverters for Utility Applications," *31st Annual IEEE Power Electronics Specialists Conference. PESC 00. Conference Proceedings.*, Galway, Ireland, pp. 1191-1194, (Jun. 18-23, 2000).

*Primary Examiner*—Derek S. Boles
(74) *Attorney, Agent, or Firm*—Townsend and Townsend and Crew LLP

(57) ABSTRACT

The space heating system with fuel cells (11) has a connection to a public electrical network (50). In this system a fuel (B) can be supplied to the fuel cells in gaseous form through a main gas valve (200) for the production of thermal and electrical energy. The main gas valve has a control which, on an interruption of the current supplied, results in an automatic operating shutdown. The possibilities exist for the system to feed the electrical energy at least partly into the network and to deliver the thermal energy to a heating circuit which is operable with electrical energy from the network. An electrical inverter (4), with which direct current of the fuel cells can be converted into alternating current, can be operated in two operating states, on the one hand, for a feed into the public network, and, on the other hand, for a feed into the island network of the system. Means are provided with respect to a power cut of the public network by which a short-term maintenance of necessary functions of the space heating system—the fuel supply into the fuel cells having first priority—is ensured without support by, for example, galvanic batteries. Moreover, controls and circuits are provided with which at least the necessary functions of the space heating system can continue to be maintained by means of electrical energy from the fuel cells.

16 Claims, 1 Drawing Sheet

U.S. PATENT DOCUMENTS 5,819,843 A * 10/1998 Inoue et al. ................ 165/219
5,985,474 A    11/1999 Chen et al.
6,025,083 A *  2/2000 Veyo et al. .................. 429/13
6,093,500 A    7/2000 Margiott et al.
6,290,142 B1 * 9/2001 Togawa et al. ............ 237/12.1
6,551,731 B1 * 4/2003 Berg et al. .................... 429/13
6,743,536 B1 * 6/2004 Fuglevand ..................... 429/9

FOREIGN PATENT DOCUMENTS

JP          02311134 A    12/1990

* cited by examiner

SPACE HEATING SYSTEM WITH FUEL CELLS AND A CONNECTION TO A PUBLIC ELECTRICAL NETWORK

BACKGROUND OF THE INVENTION

The invention relates to a space heating system with fuel cells and a connection to a public electrical network and a method for the operation of the system.

A space heating system is known from EP-A-1 205 993 in which thermal and electrical energy is recovered, and can be used, from a gas mixture containing hydrogen and carbon monoxide by means of high temperature fuel cells. A particular control is described with which a reliable and hazard-free operation of the system is ensured. The thermal energy can be used for heating service water and/or for space heating. The electrical energy can be used for the actuation of sensors and actuators (e.g. for the operation of pumps). A surplus of this form of energy can also be supplied to a public network. The gas mixture is led through a main gas valve arranged upstream of the fuel cells. The control of this valve is designed such that, on an interruption of the current required for the valve control, the valve closes and the energy-delivering operation of the fuel cells is thus stopped. An interruption over a longer period results in the fuel cells cooling. Interruptions to operation are damaging for the fuel cells because thermal cycles with cooling and renewed heating cause the electrochemically active components of the cells to age rapidly. Power interruptions in the public network therefore result in an ageing of the fuel cells which would not necessarily have to occur. With the aid of, for example, galvanic batteries or emergency power generators, the operation of the space heating system could be maintained if required when a network power cut occurs. Such support measures, however, mean added costs which only arise due to possible network power cuts; they also require a regular inspection and maintenance, e.g. recharging or replacing the batteries.

SUMMARY OF THE INVENTION

It is therefore an object of the invention to provide a space heating system in which precautionary measures are installed by which the operation of the system can be continued when a network power cut occurs, with these measures not being support measures of the kind associated with a maintenance effort.

The space heating system with fuel cells has a connection to a public electrical network. In this system, a fuel is supplied in gaseous form to the fuel cells through a main gas valve for the production of thermal and electrical energy. The main gas valve has a control which results in an automatic operating shutdown on an interruption of the current supplied. The possibilities exist for the system of feeding the electrical energy at least partly into the network and of releasing the thermal energy to a heating circuit, with the heating circuit also being operable with electrical energy from the network. An electrical inverter with which direct current of the fuel cells can be converted into alternating current can be operated in two operating modes: on the one hand, for a feed into the public network and, on the other hand, for a feed into an island network of the system. Means are provided with respect to a power cut of the public network by which a short-term maintenance of required functions of the space heating system is ensured—the fuel supply into the fuel cells having first priority—without support by, for example, galvanic batteries. Moreover, controls and circuits are provided with which at least the required functions of the space heating system can continue to be maintained by means of electrical energy from the fuel cells.

The invention will be explained in the following with reference to the drawings.

DESCRIPTION OF THE PREFERRED EMBODIMENTS

Figure 1:
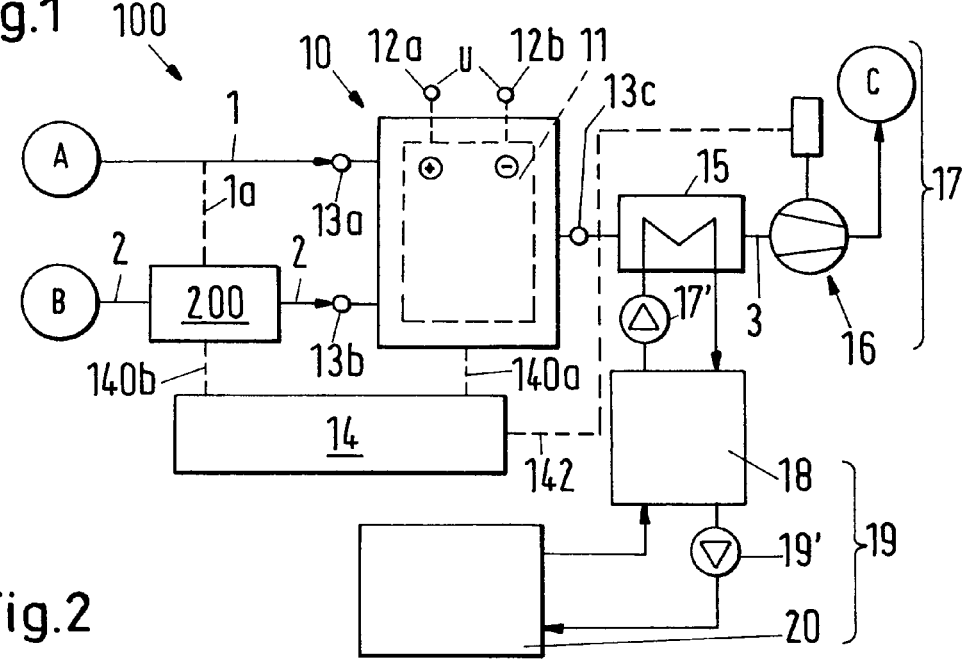
FIG. 1 is a schematic representation of a part of a space heating system.
Figure 2:
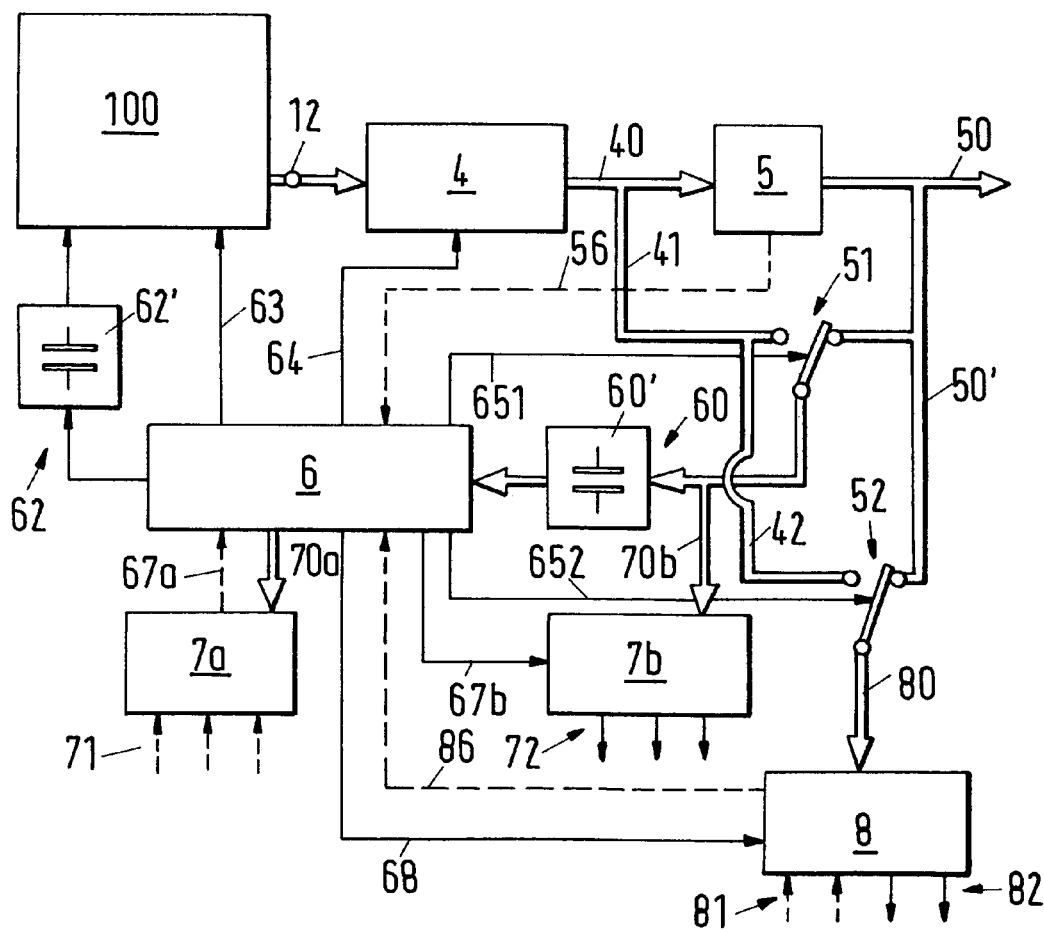
FIG. 2 shows the whole space heating system in which measures have been realized for the prevention of interruptions to operation.

A part system 100—a part of the space heating system of FIG. 2—shown in FIG. 1 is described in detailed form and with reference to diverse variants in the aforesaid EP-A-1 205 993. It includes a fuel cell battery 10 which has a stack 11 of fuel cells connected in series and in which electrical energy (voltage U) and hot exhaust gas are produced with two gaseous educts A and B. The electrical energy is delivered to a further part of the space heating system via two poles 12a, 12b. This further part is shown in FIG. 2. The two poles 12a, 12b appear there as one single terminal point, the electrical output 12. The educts A and B are supplied to the battery 10 through lines 1 and 2 and inputs 13a and 13b respectively. The hot exhaust gas is sucked off by a fan 16 at an outlet 13c, with it being transported through a line 3 as well as a heat exchanger 15. Cooled exhaust gas C is delivered to the environment. The fan 16, with which exhaust gas is sucked in, is arranged downstream of the battery 10 for safety reasons. This suction member could also be replaced by a fan disposed upstream of the battery 10; then, however, overpressure would result in the fuel cells in operation.

The waste heat recovered from the hot exhaust gases by the heat exchanger 15 is transported to a heat accumulator 18 by means of a heat transfer medium (advantageously water) via a circuit 17 with a pump 17'. The waste heat can be supplied from the accumulator 18 via a second circuit 19 with a pump 19' to a consumer 20, for example radiators of a building. The two heating circuits, namely the circuit 17 and the circuit 19, are termed the "producer circuit" and the "consumer circuit" respectively in the following, with the reference numerals 17 and 19 still being used for these heating circuits.

The educt A is as a rule air which is sucked in from the environment. The educt B is a fuel which is gaseous or is put into gaseous form. This gas is led through a plant part 200 in which a main gas valve and means for the control of performance are arranged (cf. EP-A-1 205 993). On an interruption of power, the main gas valve closes such that the battery operation is stopped. The control of the main gas valve is exerted by a plant part 14. This control unit 14 is connected via lines 140a to sensors of the battery 10, via lines 140b to the plant part 200 and via lines 142 to the fan 16. The infeeds of the educts A and B are coupled to one another via a connection 1a and the plant part 200.

The characteristic features for the invention are shown in FIG. 2. Lines for line transports are shown with double lines, lines for controls (actuators) with single lines and lines for information transfers (sensors) with broken lines. The part plant 100 of FIG. 1 is connected via the electrical output 12 to an electrical inverter 4 with which direct current of the fuel cells is converted into alternating current. The inverter 4 can be operated in two operating modes. In the one state, the alternating current is supplied to the public network via lines 40, 50; in the other state, the alternating current is fed via a line 41 into an island network which belongs to the system in accordance with the invention. When an interruption of power occurs in the public network, a "network release" is arranged between the lines 40 and 50, namely a device 5 with which the feed of the alternating current into the network is stopped and suitable operations are initiated in the island network.

The island network is in a programmed state which is set by a system control 6. The system control 6 also includes an energy management of the space heating with which, for example, the charge state of the heat accumulator 18 is managed. A first switch 51 (control 651) and a second switch 52 (control 652) can be actuated by means of the system control 6. The main gas valve and the performance control of the part system 100 (plant part 200) are respectively connected to the system control 6 via a control line 62 and 63 respectively. A further control line 64 leads to the inverter 4. The network release 5 and the system control 6 are connected via an information line 56. The control line 62 includes a "network power cut bridge" by which a short-term maintenance of necessary functions of the space heating system is ensured—the fuel supply into the fuel cells having first priority—without support by, for example, galvanic batteries.

Lines 67a, 70a and 67b respectively are present between system sensors 7a, which are associated with the producer circuit 17 (arrows 71), and system actuators 7b, which are likewise associated with the producer circuit 17 (arrows 72). A line 60 is present for a feed of alternating current from the public network, or from the inverter 4, into the system control 6, and a "network power cut bridge" 60' is also provided in the line 60. The system actuators 7b are supplied with electrical energy via a branch line 70b. Finally, the system control 6 is connected via lines 86 and 68 to a system part 8 which contains sensors and actuators for the consumer circuit 19 (arrows 81 and 82 respectively). The alternating current required for this system part 8 is supplied via the line 80 linked at the switch 52. The alternating current can be taken from the network (line 50') or from the inverter 4 (line 42).

The inverter 4 can be switched from the one operating mode into the other within a relatively short time period Δt. This time period Δt is not larger than approximately 0.1 seconds. The power supply of the valve control by the control line 62 is secured during a time period which is larger than Δt by a buffer which, for example, includes a capacitor 62' such that the fuel supply into the fuel cells takes place without interruption.

The space heating system in accordance with the invention can be operated in accordance with the following three modes:

Mode M1: The switches 51 and 52 have the states represented in FIG. 2. The part plant 100 with the battery 10 is not in operation, or it is just being put into operation. The electrical power delivered by the battery 10 is less than 100 W (This is an illustrative numerical example which will be maintained in the following. The value of 100 W can also be modified. This also applies to further value figures). The inverter 4 is in its first operating mode. The total produced electrical power is supplied to the public network. The producer circuit 17 and the consumer circuit 19 receive electrical power from the network.

Mode M2: The electrical performance of the part system 100 is larger than 100 W and less than 200 W. The switch 51 is thrown and the inverter 4 produces sufficient alternating current so that the system control 6 and the actuators 7b can be fed directly from the inverter 4.

Mode M3: The electrical performance of the fuel cells is larger than 200 W. The inverter 4 produces sufficient alternating current to supply both the producer circuit 17 and the consumer circuit 19. For this purpose, the switch 52 is actuated such that electrical energy from the inverter is also deliverable to the consumer circuit 19. The consumer circuit 19 includes means for the further transport of heat from the heat accumulator 18 to the consumer 20 and for a control of this heat transport.

On a network power cut, the network release 5 cuts the lines 40 and 50; the switch 51 is thrown so that the system control 6 and the actuators 7b can be fed directly from the inverter 4. During the switch-over time Δt, the network power cut bridge of the supply line 60 ensures that the system control 6 maintains necessary functions of the space heating system until after a switch-over of the inverter 4, on the one hand, and the network power cut bridge of the line 62 ensures that the main gas valve (for the educt B) also continues to remain open on a short power cut of the power supply, on the other hand. The operation of the producer circuit 17 remains interrupted during the switch-over time Δt. The consumer circuit 19 can be out of operation for some minutes after the network power cut due to a thermal buffer effect of the consumer 20 (heated building). This time is sufficient to increase the gas supply and so to increase the production of the electrical power to a sufficient degree. This power must exceed a threshold value N2.

There are two thresholds N1 and N2 which are pre-set due to properties of the system for the electrical power produced with the fuel cells, namely the requirement for power to operate the producer circuit 17 and the requirement for power to operate both heating circuits 17 and 19. In the above-described numerical example, N1=100 W and N2=200 W. Depending on the power requirement with respect to the two threshold values, the operation is carried out in one of the three modes, with the two switches 51, 52 being switched in accordance with the mode to be selected by the system control 6. So that the plant does not switch off on a network power cut, the gas supply is controlled by the system control such that the threshold value N1 is permanently exceeded. The gas supply can be modulated in a wide range due to the splitting of the operation into modes by means of the thresholds N1 and N2.

In accordance with the three modes, different methods of operation also result:

The electrical power produced with the fuel cells is less than N1 (Mode M1). This power is not sufficient for operation of all components of the system. Current is therefore taken from the public network.

The electrical power produced with the fuel cells is larger than N1 (Mode M2). This power is delivered to the producer circuit 17. If the network release 5 connects the lines 40 and 50, the excess power is delivered to the public network.

The electrical power produced with the fuel cells is larger than N2 (Mode M3). This power is delivered to the producer circuit, to the consumer circuit and—if the network release 5 connects the lines 40 and 50—to the public network.

The invention claimed is:

1. A space heating system comprising fuel cells for generating electrical power and heat energy from a fuel gas, an electrically regulated main valve for controlling a flow of the fuel gas to the fuel cells, a heating circuit for heating a space, the heating circuit being operable with the heat energy and including controls for regulating the heating circuit, switching for selectively supplying the electrical power from the fuel cells to a public electrical power network and to at least one of the electrically regulated main valve and the heating circuit, and for selectively supplying electric energy from the public network to at least one of the electrically regulated main valve and the heating circuit, and a controller for setting the switching to direct the electrical power from the fuel cells to the public network and to direct the electric energy from the public network to the heating circuit in a first operational mode and to direct the electrical power from the fuel cells to the electrically regulated main valve to maintain operation of the fuel cells when the electric energy from the public network fails in a second operational mode.

2. A space heating system according to claim 1 wherein the controller sets the switching so that the electrical power from the fuel cells maintains the heating circuit operating when the electric energy from the public network fails.

3. A space heating system comprising fuel cells for generating electrical power and heat energy from a fuel gas, an electrically regulated main valve for controlling a flow of the fuel gas to the fuel cells, a heating circuit for heating a space, the heating circuit being operable with the heat energy and including controls for regulating the heating circuit, switching for selectively supplying the electrical power from the fuel cells to a public electrical power network and to at least one of the electrically regulated main valve and the heating circuit, and for selectively supplying electric energy from the public network to at least one of the electrically regulated main valve and the heating circuit, a controller for setting the switching to direct the electrical power from the fuel cells to the public network and to direct the electric energy from the public network to the heating circuit in a first operational mode and to direct the electrical power from the fuel cells to the electrically regulated main valve to maintain operation of the fuel cells when the electric energy from the public network fails in a second operational mode, and a buffer supplying the electrically regulated main valve with electricity while the controller sets the switching to prevent an interruption of the operation of the fuel cells when the electric energy fails.

4. A space heating system according to claim 3 wherein a time interval $\Delta t$ for setting switching when the electric energy from the public network fails is no more than 0.1 second, and wherein the buffer supplies the electrically regulated main gas valve with electricity for a time period longer than $\Delta t$ so that the fuel cells are provided with the fuel gas without interruption.

5. A space heating system according to claim 4 wherein the buffer includes a capacitor.

6. A space heating system according to claim 5 including a second buffer associated with the controller for supplying the switching and the heating circuit with electricity when the electric energy from the public network fails.

7. A space heating system according to claim 3 including a heat exchanger operatively coupled with the fuel cells and the heating circuit for transferring heat in hot exhaust gases from the fuel cells to the heating circuit.

8. A space heating system according to claim 7 wherein the heating circuit includes radiators for heating the space, and wherein the heating circuit further includes a heat accumulator for transporting heat from the accumulator to the radiators to heat the space.

9. A space heating system according to claim 8 wherein the switching is kept in its second operational mode for at least as long as the electric energy from the public network fails so that electric power from the fuel cells maintains the heating circuit operating.

10. A space heating system according to claim 3 including an inverter for converting direct current generated by the fuel cells into alternating current.

11. A method of heating a space with a system including fuel cells for generating electrical power and heat energy from a fuel gas, an electrically regulated main valve for controlling flow of the fuel gas to the fuel cells, a consumer circuit for heating the space, and switching for selectively electrically connecting the fuel cells, the electrically regulated main valve, the consumer circuit, and a public electrical power network, the method comprising determining first and second electrical power thresholds for the electrically regulated main valve and the consumer circuit, respectively, the first threshold being smaller than the second threshold, establishing first and second operating modes for the system which are reflective of the electrical power generated by the fuel cells, selecting one of the operating modes as a function of the electrical power generated by the fuel cells to assure uninterrupted generation of electrical power by the fuel cells, and setting the switching so that electrical energy supplied by at least one of the electrical power from the fuel cells and electrical power from the public network exceeds the first threshold to prevent a discontinuation of the operation of the fuel cells and resulting damage to the fuel cells.

12. A method according to claim 11 wherein the electrical power generated by the fuel cells is less than the first threshold, and wherein setting the switches comprises setting the switches so that all electrical power generated by the fuel cells is fed to the public network and electrical power required to operate the electrically regulated main valve and the consumer circuit is supplied from the public network.

13. A method according to claim 11 wherein the electrical power generated by the fuel cells is larger than the first threshold, and wherein setting the switching comprises setting the switching so that electrical power from the fuel cells is applied to the electrically regulated main valve and so that any remaining electrical power generated by the fuel cells is fed to the public network.

14. A method according to claim 11 wherein the electrical power generated by the fuel cells exceeds the second threshold, and wherein setting the switching comprises setting the switches so that the electrical power generated by the fuel cells is applied to the electrically regulated main valve and the consumer circuit and so that any excess electrical power generated by the fuel cells is fed to the public network.

15. A method according to claim 11 wherein, during one mode of operation, the switching is set so that the electrical power generated by the fuel cells is fed to the public network and electrical power requirements of the main valve and the consumer circuit are supplied from the public network, and wherein, in response to a failure of the public network to supply electrical energy, the switching is reset so that the electrical power generated by the fuel cells is applied to the electrically regulated main valve to maintain operation of the fuel cells during the power failure.

16. A method according to claim 11 wherein establishing comprises establishing first, second and third operating modes.

* * * * *